United States Patent [19]
Shiraishi et al.

[11] Patent Number: 5,366,041
[45] Date of Patent: Nov. 22, 1994

[54] VEHICLE CONTROL SYSTEM

[75] Inventors: Masaru Shiraishi, Hatsukaichi; Yuji Tashiro, Hiroshima, both of Japan

[73] Assignee: Mazda Motor Corporation, Hiroshima, Japan

[21] Appl. No.: 906,284

[22] Filed: Jun. 29, 1992

[30] Foreign Application Priority Data

Jun. 27, 1991 [JP] Japan .................. 3-156959

[51] Int. Cl.⁵ ............................................ B60K 17/35
[52] U.S. Cl. .................................. 180/248; 180/233; 180/250; 475/237; 364/426.03
[58] Field of Search ............... 180/248, 249, 250, 245, 180/246, 244, 233; 475/237; 364/424.01, 426.03

[56] References Cited

U.S. PATENT DOCUMENTS

| | | | |
|---|---|---|---|
| 4,700,797 | 10/1987 | Leiber | 180/249 |
| 4,926,329 | 5/1990 | Stelter et al. | 180/248 |
| 5,199,325 | 4/1993 | Reuter et al. | 180/248 |
| 5,208,755 | 5/1993 | Tezuka | 180/248 |

FOREIGN PATENT DOCUMENTS

| | | |
|---|---|---|
| 62-166114 | 7/1987 | Japan . |
| 63-2729 | 1/1988 | Japan . |
| 3-200423 | 9/1991 | Japan . |

*Primary Examiner*—Kenneth R. Rice
*Assistant Examiner*—Anne Marie Boehler
*Attorney, Agent, or Firm*—Keck, Mahin & Cate

[57] ABSTRACT

A four-wheel drive vehicle control system has a differential mode control device which operates in at least a first mode, in which differential action of a differential is variably restricted between an unlocked state and a locked state according to driving conditions, and a second mode, in which the differential is forcibly locked. The first and second modes are manually selected by the driver.

23 Claims, 9 Drawing Sheets

VEHICLE CONTROL SYSTEM

BACKGROUND OF THE INVENTION

1. Field of the Invention

This invention is concerned with a control system for an automotive vehicle and, in particular, to a control system for a four-wheel drive automotive vehicle equipped with a differential limiting mechanism.

2. Description of Related Art

Most four-wheel drive vehicles are equipped with a center differential between front and rear axles, a front differential between the front wheels, and a rear differential between the rear wheels. These differentials drive the front and rear wheels at the same time but allow them to turn at different speeds when negotiating turns in order to prevent slippage during cornering. Some four-wheel drive vehicles of this type are equipped with a center differential, a front differential, and a rear differential which are controlled to lock and unlock by means of hydraulic pressure. Such a four-wheel drive vehicle is known from, for instance, Japanese Unexamined Patent Publication No. 62-166,114.

In such a vehicle, information regarding velocity of each wheel and steering angle is input into a control circuit to make, on the basis of the information, various decisions with respect to, for instance, road conditions, line traveling direction, acceleration and braking. According to traveling conditions determined on the basis of these decisions, the front, rear and center differentials are controlled to provide improved steering stability, acceleration quality and braking quality. The control circuit automatically controls each of the differentials on the basis of signals representative of the wheel velocities and steering angle.

There is also a need to permit a driver to exercise some differential control to adjust, for example, to road conditions, such as in-city road conditions and poor off-road conditions.

SUMMARY OF THE INVENTION

It is, therefore, an object of the present invention to provide a vehicle control system which allows the driver to select various patterns of differential action of a differential using his or her own discretion in order To provide superior car handling and driving stability.

The above object is accomplished by providing a particular vehicle control system for controlling a four-wheel drive vehicle having differentials which drive wheels at the same time but allows the wheels to turn at different wheel speeds. The vehicle control system has a differential mode control means which operates in various different modes, including at least a first mode, in which differential action of at least one of the differentials, such as a center differential, is variably restricted between an unlocked state and a locked state according to driving conditions, and a second mode, in which the at least one of the differentials is forcibly locked. These first and second modes are selectively changed by a manually operated switch at the driver's discretion.

The differential mode control means also operates in a first mode, in which action of both first and second differentials, such as center and rear differentials, are variably restricted between an unlocked state and a locked state according to driving conditions detected by driving condition detecting means, and in a second mode, in which the first differential is forcibly locked and differential action of the second differential is variably restricted between the unlocked state and the locked state according to the driving conditions.

In addition to operating in the first and second modes, the differential mode control means can operate in a third mode, in which both the first and second differentials are forcibly locked. Moreover, in addition to operating in the first to third modes, the differential mode control means can also operate in a fourth mode, in which differential action of the first differential is variably restricted and the second differential is forcibly locked.

For four-wheel drive vehicles having a center, rear and front differentials, the differential mode control means can operate in different modes, at least including first, second and third modes. In the first and second modes, the differential mode control means controls the center and rear differentials in the same way as described but controls the front differential so that it remains unlocked. However, in the third mode, the differential mode control means forcibly locks all three of the differentials.

Because the differential mode control means allows selection of various differential characteristics at the discretion of the driver, significantly improved car handling and driving stability can be realized independently of road conditions.

DETAILED DESCRIPTION OF THE PREFERRED EMBODIMENT

Because differentials are generally well known, the following description is directed to particular elements forming parts of, or cooperating directly with, a control system in accordance with the present invention. It is be understood that elements not specifically shown described can take various forms well known to those skilled in the differential art.

Figure 1:
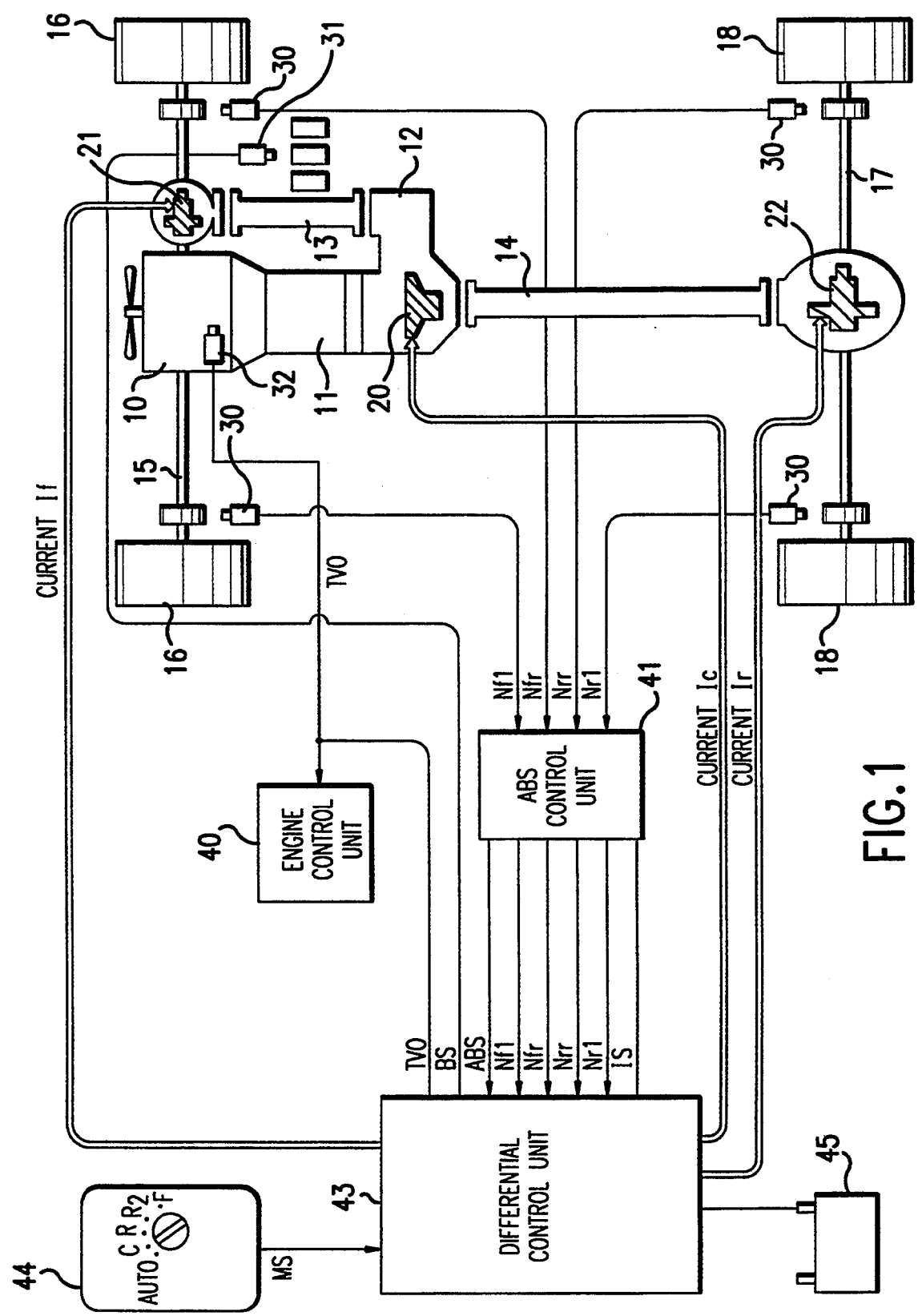
FIG. 1 is a schematic illustration showing a structure of a four-wheel drive vehicle controlled by a vehicle control system in accordance with a preferred embodiment of the present invention.

Referring to the drawings in detail and, in particular, to FIG. 1, a control system for a four-wheel drive automotive vehicle in accordance with a preferred embodiment of the present invention is shown. In FIG. 1, a power train may be seen to include an engine 10. The output of the engine 10 is transmitted, through a transmission 11, to a transfer 12, and then through front and rear propeller shafts 13 and 14 to front and rear wheels 16 and 18, respectively. The front wheels 16 are connected to the front propeller shaft 13 through front axles 15, and the rear wheels 18 are connected to the rear propeller shaft 14 through rear axles 17. A center differential 20, a front differential 21 and a rear differential 22 are, respectively, connected to transfer 12, the front axles 15 and the rear axles 17. In order to detect wheel velocity of each wheel, four wheel speed sensors 30 are provided. These wheel speed sensors may be optical speed sensors well known in the art and commercially available.

Engine control unit 40 receives an electric signal representative of a throttle opening from a throttle sensor 32. Anti-skid braking control unit 41, which controls an anti-skid braking system (ABS), receives an electric signal representative of a wheel speed of each wheel from the wheel speed sensor 30. Differential control unit 43 is connected to the battery and to a mode selection switch 44 which is manually operated to select differential lock modes which will be described shortly. The differential control unit 43 receives electric signals from various sources. These signals include a throttle opening signal TVO received from the throttle sensor 32, a braking signal BS received from a brake switch 31, which indicates activation of brakes of the vehicle, an anti-skid braking signal ABS received from the anti-skid braking control unit 41, which indicates the activation of the anti-skid braking system, wheel speed signals Nfr, Nfl, Nrr and Nrl received from the wheel speed sensors 30, and a control mode signal MS received from the mode selection switch 44. Electric control currents corresponding to these electric signals are sent to the center differential 20, the front differential 21 and the rear differential 22, respectively. Depending upon the level or strength of the control current, these differentials 20, 21 and 22 are placed in an unlocked state, a semi-locked state, or an entirely locked state. An interruption signal IS is also provided from the differential control unit 43 to the anti-skid braking control unit 41 in order to interrupt activation of the anti-skid braking system.

Figure 2:
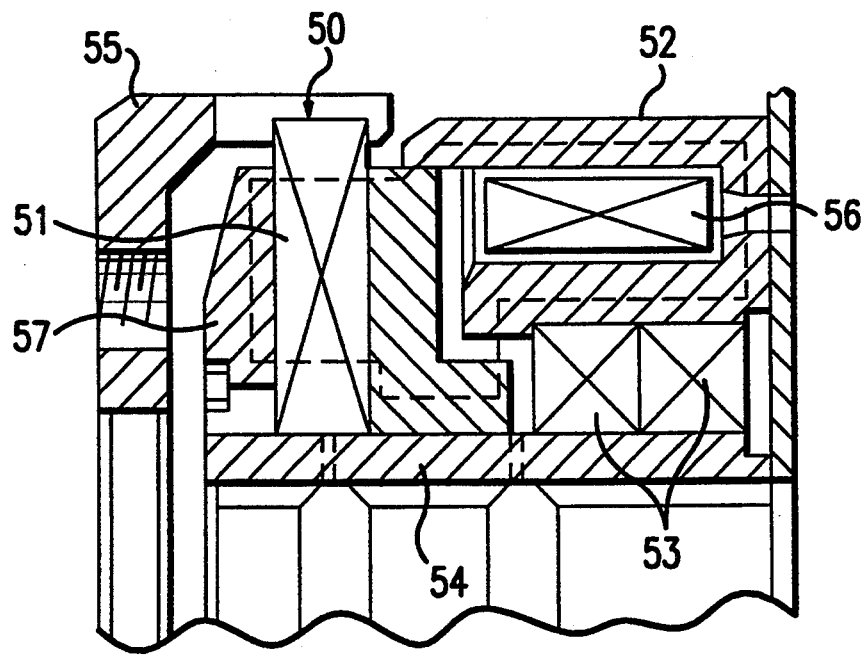
FIG. 2 is a cross-sectional view of a multi-plate solenoid clutch incorporated in each differential of the vehicle shown in FIG. 1.

Referring to FIG. 2, a multi-plate solenoid clutch 50 is shown. The clutch 50 is incorporated in the center differential 20. The center differential 20 is actually brought into an unlocked state, a semi-locked state and an entirely locked state by the multi-plate solenoid clutch 50. The multi-plate solenoid clutch 50 can be of any known type which permits limiting of the differential actions between the front propeller shaft 13 and the rear propeller shaft 14. The multi-plate solenoid clutch 50 has a clutch disk means 51, composed of inner disks and outer disks, and an electric actuator 52, having a built-in solenoid 56 and an armature 57. The multi-plate solenoid clutch 50 coupled to the front and rear propeller shafts 13 and 14 by a front power transmission member 54 and a rear power transmission member 55, respectively. The electric actuator 52 is mounted on the front power transmission member 54 through thrust bearings 53. When a control current is applied to the built-in solenoid 56, the electric actuator 52 causes the armature 57 to apply pressure to the clutch disk means 51 by an electromagnetic force generated by the solenoid 56. The locking pressure for the clutch disk means 51 is the torque produced by the multi-plate solenoid clutch 50. Since this locking pressure is proportional to a level or strength of the control current applied to the solenoid 56, the rotational speed of the center differential 20 can be continuously varied by changing the level or strength of the control current.

Front and rear differentials 21 and 22 are also provided with respective solenoid clutches. Because the solenoid clutches of the differentials 21 and 22 have the same structure and function as those of the solenoid clutch 50, description of the solenoid clutches of differentials 21 and 22 is not provided.

Available differential modes are manually selected by a mode select switch 44 according to various positions. The mode select switch may be placed in positions for selecting AUTO, C, R and F modes. The conditions of each differential in the particular modes available are shown in TABLE I. Selection of these modes is made by the driver.

TABLE I

| Mode | Differential | Control (Current) |
|---|---|---|
| AUTO (A Mode) | Front | Unlock ($If = 0$) |
| | Center | Auto Mode Control |
| | Rear | Auto Mode Control |
| C (C Mode) | Front | Unlock ($If = 0$) |
| | Center | Entire Lock ($Ic = 2.2A$) |
| | Rear | Auto mode Control |
| R (R Mode) | Front | Unlock ($If = 0$) |
| | Center | Entire Lock ($Ic = 2.2A$) |
| | Rear | Entire lock ($If = 4.1A$) |
| R2 (R2 Mode) | Front | Unlock ($If = 0$) |
| | Center | Auto mode Control |
| | Rear | Entire lock ($Ir = 4.1A$) |
| F (F Mode) | Front | Entire lock ($If = 2.1A$) |
| | Center | Entire Lock ($Ic = 2.2A$) |
| | Rear | Entire Lock ($Ir = 4.1A$) |

As shown in TABLE I, when the mode select switch 44 is placed in its Auto position so as to select an automatic mode (which is referred to as an A mode in TABLE I), the front differential 20 is unlocked, and auto mode control is applied to the center and rear differentials 20 and 22. When the switch 44 is placed in the C position, in which the C mode is selected, the front differential 21 is unlocked, the center differential 20 is entirely locked, and the auto mode control is applied to the rear differential 22. When the switch 44 is placed in the R position, in which the R mode is selected, the front differential 21 is unlocked, and center and rear differentials 20 and 22 are entirely locked. When the switch 44 is placed in the R2 position, in which the R2 mode is selected, the front differential 21 is unlocked, the center differential 20 is placed in the auto mode control, and the rear differential is entirely locked. Finally, when the switch 44 is placed in the F position, in which the F mode is selected, all three differentials 21, 20 and 22 are entirely locked. In TABLE I, If, Ic and Ir represent control current levels applied to the solenoid clutches of the front differential 21, the center differential 20 and the rear differential 22, respectively. Certain levels of current are necessary to lock or place the clutches in locked states.

The A mode is best suited for ordinary city driving and is the least restricted mode. In the A mode, the front differential 21 is unlocked. The F mode, in which the front differential 21, the center differential 20, and the rear differential 22 are all entirely locked, is most appropriate for off-road driving. Although there is reduced handling in this mode, running ability or traction is superior. Handling or operability and running ability in the C mode and the R mode fall in between those in the A mode and the F mode.

The operation of the four-wheel drive vehicle control system depicted in FIGS. 1 and 2 will be best understood by reviewing FIGS. 3 to 6 and 9 to 11, which are flow charts illustrating various routines and subroutines for a microcomputer of the differential control unit 43. Programming a computer is a skill well understood in the art. The following description is written to enable programmers having ordinary skill in the art to prepare an appropriate program for the microcomputer. The particular details of any such program would, of course, depend upon the architecture of the particular computer selected.

Figure 3:
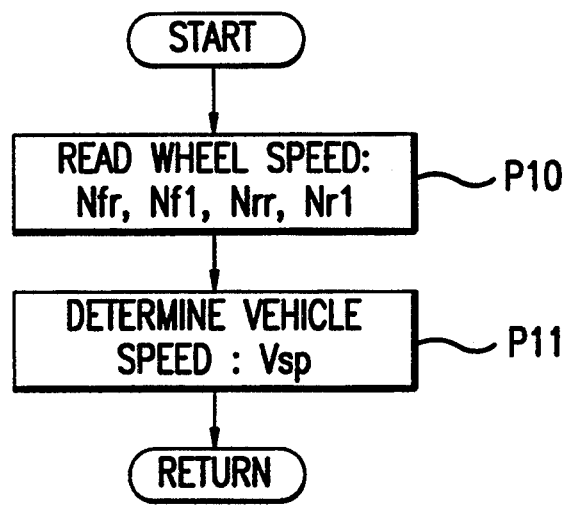
FIG. 3 is a flow chart illustrating a vehicle speed determination routine in an auto-control mode for a microcomputer of a control unit.

FIG. 3 is a flow chart illustrating a vehicle speed determination subroutine in the A mode control. At step P10, signals representative of wheel speeds Nfr, Nfl, Nrr and Nrl of the front right wheel, the front left wheel, the rear right wheel and the rear left wheel, respectively, are input from the wheel speed sensors 30. At step P11, the minimum speed among the wheel speeds Nfr, Nfl, Nrr and Nrl is selected and determined as a vehicle speed Vsp.

Figure 4:
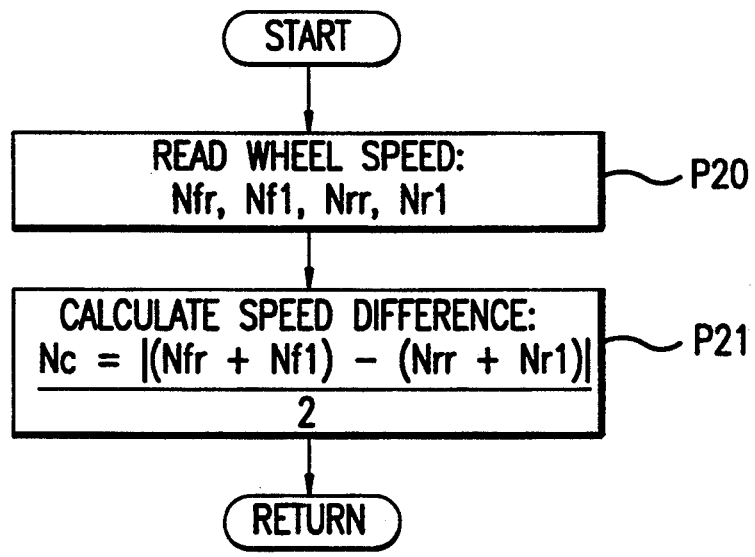
FIG. 4 is a flow chart illustrating a speed difference operation subroutine for obtaining a differential speed of the center differential in the auto-control mode for the microcomputer.

FIG. 4 is a flow chart illustrating a speed difference operation subroutine in the A mode control for obtaining a speed difference Nc in the center differential 20. The speed difference Nc is the difference in rotational speed between the front and rear propeller shafts 13 and 14. At step P20, signals representative of the wheel speeds Nfr, Nfl, Nrr and Nrl are input from the wheel speed sensors 30. At step P21, a speed difference No is obtained from the following formula:

$$Nc = |(Nfr + Nfl) - (Nrr + Nrl)|/2$$

Figure 5:
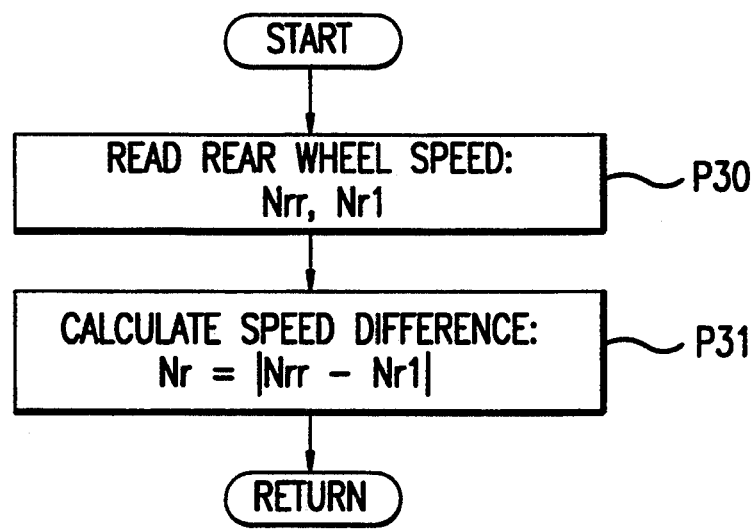
FIG. 5 is a flow chart illustrating a speed difference operation subroutine for obtaining a speed difference of the rear differential in the auto-control mode for the microcomputer.

FIG. 5 is a flow chart illustrating a speed difference operation subroutine in the A mode control for obtaining a speed difference Nr in the rear differential 22. The speed difference Nr is the difference in rotational speed between the rear axles or wheels. At step P30, signals representative of the wheel speeds Nrr and Nrl are input from the wheel speed sensors 30. At step P31, a speed difference Nr is obtained from the following formula:

$$Nr = |Nrr - Nrl|$$

Figure 6:
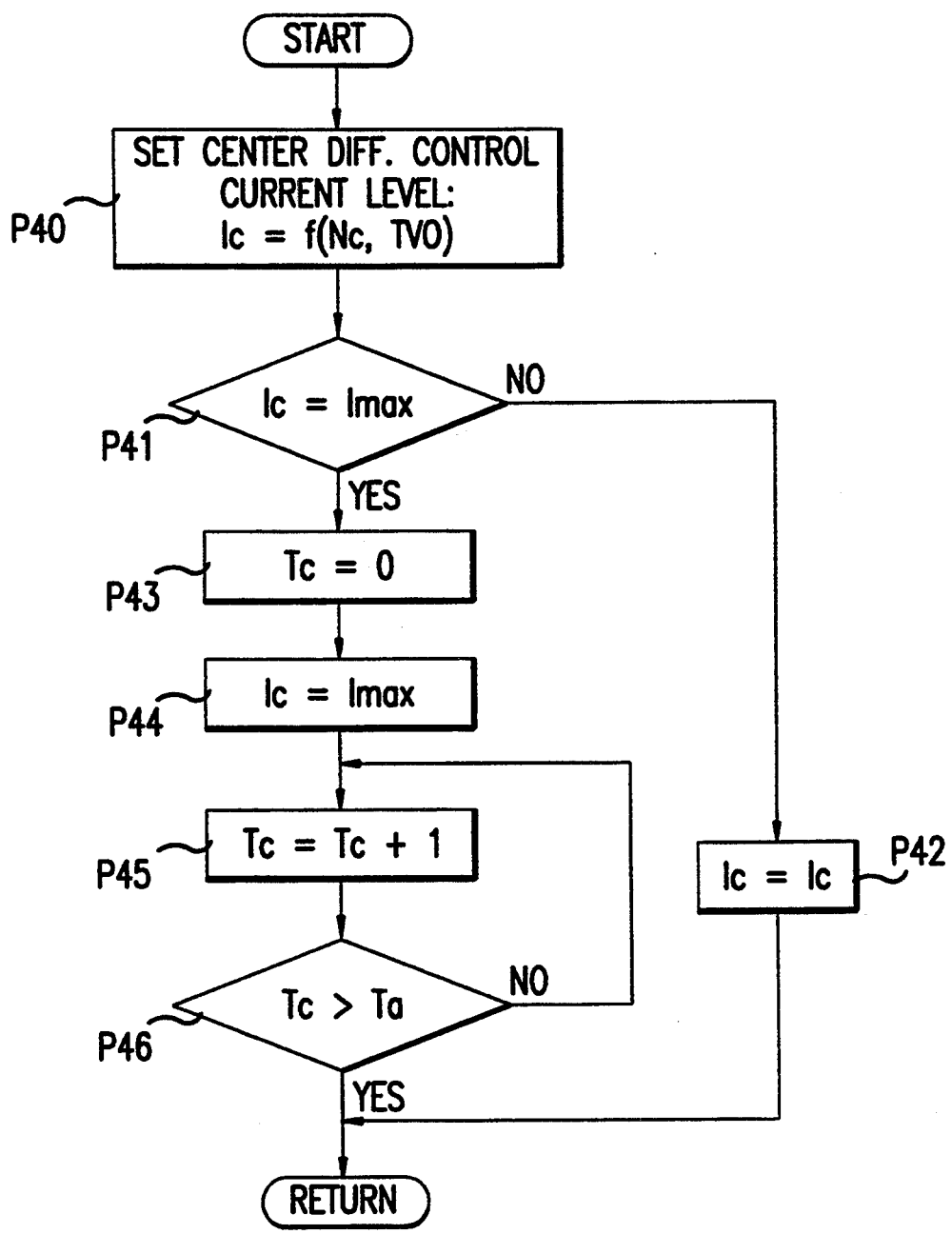
FIG. 6 is a flow chart illustrating a center differential control routine in the auto-control mode for the microcomputer.
Figure 7:
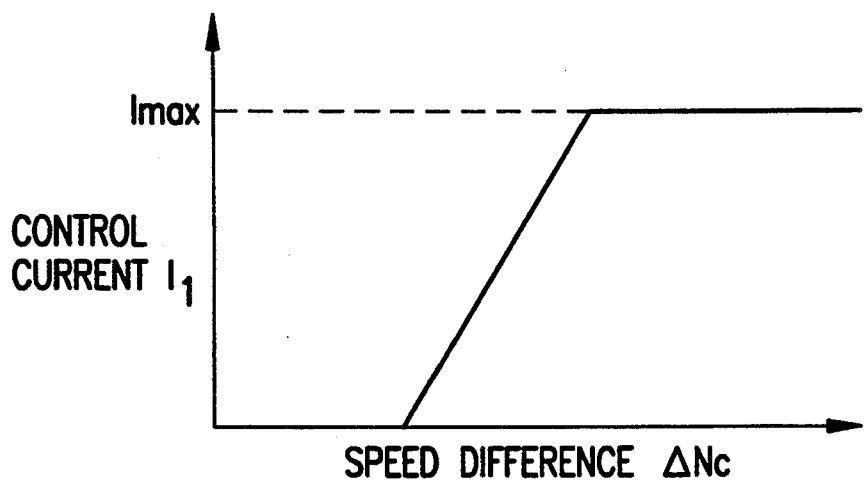
FIG. 7 is a graph showing the relationship between control current and the speed difference of the center differential.
Figure 8:
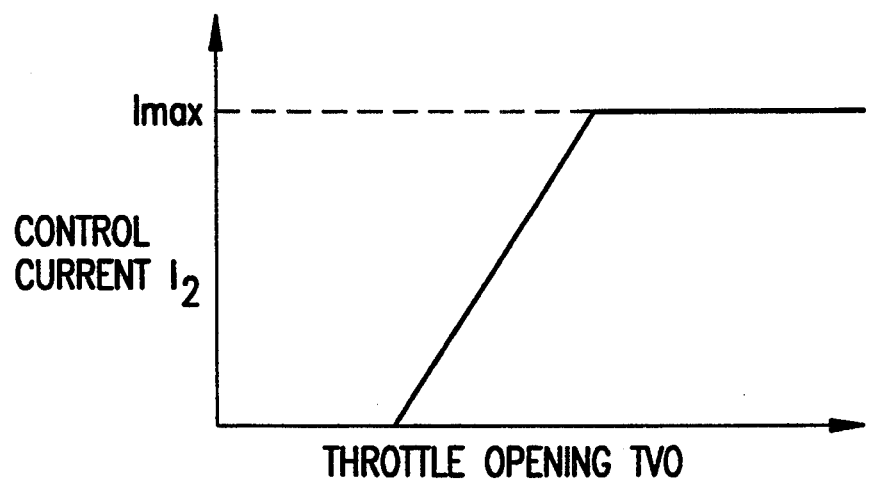
FIG. 8 is a graph showing the relationship between control current and throttle opening.

FIG. 6 is a flow chart illustrating a center differential control routine in the auto mode (A mode) control. The first step at P40 in FIG. 6 is to determine a center differential control current Ic for the center differential 20. The center differential control current Ic is obtained from a predetermined relationship between the speed difference Nc in the center differential and the throttle opening TVO; this relationship is illustrated in FIGS. 7 and 8. FIG. 7 shows the relationship between control current $I_1$ and speed difference Ns in the center differential, and FIG. 8 shows the relationship between control current $I_2$ and throttle opening TVO. If either the control current $I_1$ determined by the speed difference Nc in the center differential or the control current $I_2$ determined by the throttle opening TVO reaches a maximum control current Imax, the center differential control current Ic is set to the maximum control current Imax. On the other hand, if both the control current $I_1$ determined by the speed difference Nc in the center differential and the control current $I_2$ determined by the throttle opening TVO fall below the maximum control currents Imax, then the center differential control current Ic of the center differential 20 is obtained, from a predetermined formula, based on the control current $I_1$ and the control current $I_2$. Thereafter, a decision is made at step P41 as to whether or not the center differential control current Ic of the center differential 20 has reached the maximum control current Imax. If the answer to the decision made at step P41 is "NO," that is, the center differential control current Ic of the center differential 20 is still lower than the maximum control current Imax, then, the center differential control current Ic is held at step P42 so as to place the center differential 20 in the semi-locked state. It is to be noted that each differential is placed in an unlocked state when the control current supplied to the differential is at a zero (0) level, in an entirely locked state when the control current is at the maximum level Imax, and in semi-locked state when the control current level is between the zero (0) level and the maximum level Imax. On the other hand, if the answer to the decision made at step P41 is "YES," then after setting a timer Tc to zero (0) at step P43, the center differential control current Ic of the center differential 20 is set to the maximum level Imax at step P44 so as to place the center differential 20 in the entire locked state. Simultaneously with the placement of the center differential 20 in the entire locked state, the timer Tc starts to count time at step P45. Then, a decision is made at step P46 as to whether or not a specific or predetermined time Ta has passed or been counted up. This decision is repeated until the specific time Ta has been counted up in order to keep the center differential 20 entirely locked for the specified time Ta even though there may be a sudden increase in speed difference in the center differential Nc due to slippage between the front wheels and the rear wheels.

Figure 9:
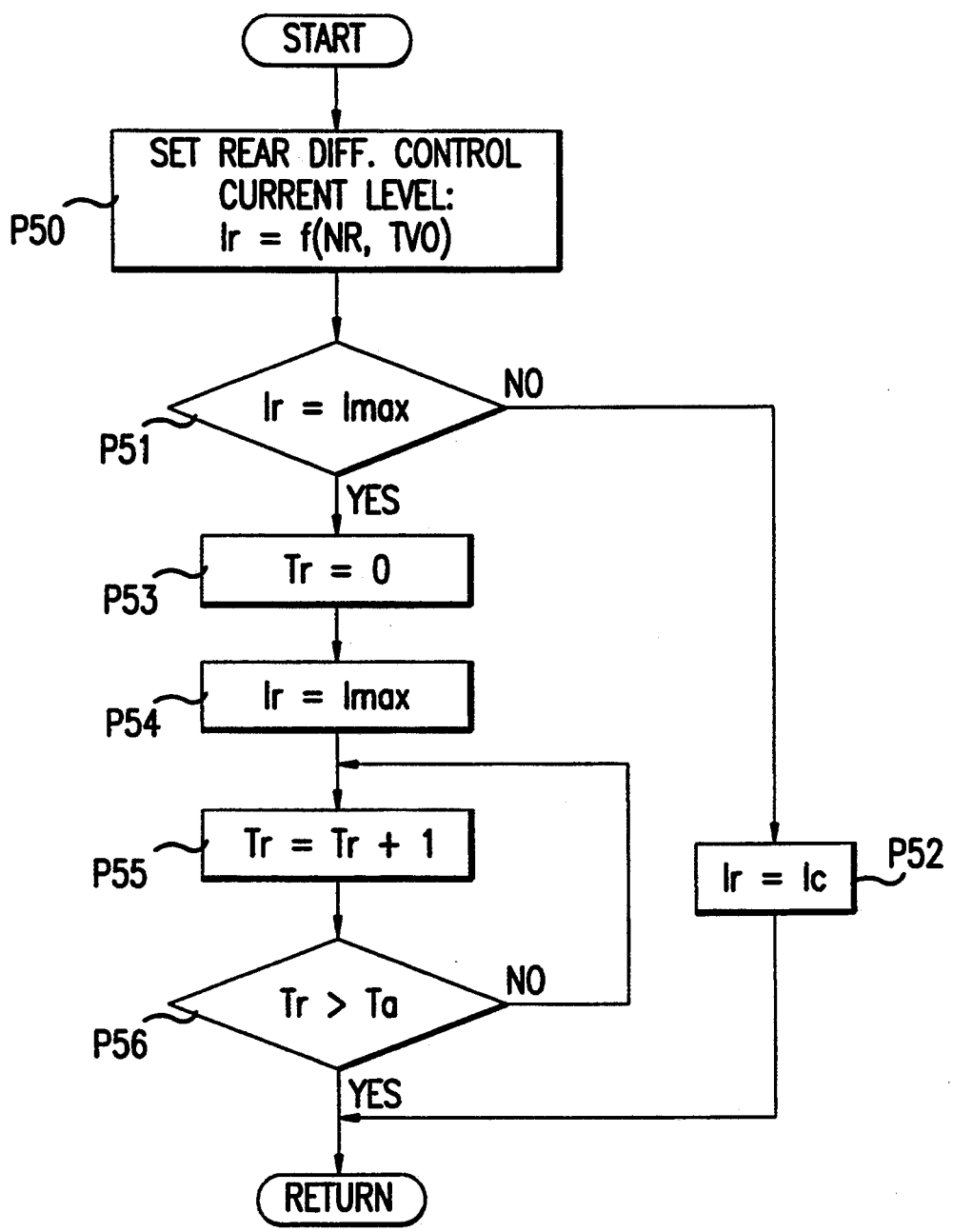
FIG. 9 is a flow chart illustrating a rear differential control routine in the auto-control mode for the microcomputer.

FIG. 9 is a flow chart illustrating a rear differential control routine in the auto mode (A mode) control. The control current supplied to the rear differential 22 is provided basically in the same manner as that supplied to the center differential 20. That is, after determining a rear differential control current Ir for the rear differential 22 from the predetermined relationships shown in FIGS. 7 and 8 at step P50, a decision is made at step P51 as to whether or not the rear differential control current Ir of the rear differential 22 has reached the maximum control current Imam. If the answer to the decision made at step P51 is "NO," the rear differential control current Ir of the rear differential 22 is still lower than the maximum control current Imax. Then, the rear differential control current Ir is held as it is at step P52 so as to place the rear differential 22 in the semi-locked state. If the answer to the decision made at step P51 is "YES," then a timer Tr is set to zero (0) at step P53. Successively, the rear differential control current Ir of the rear differential 22 is set to the maximum level Imax at step P54 so as to place the rear differential 22 in the entire locked state. Every time the timer Tr counts another unit of time at step P55, a decision is made at step S56 as to whether or not the specific or predetermined time Ta has been counted up or passed. Until the specific time Ta has passed, the rear differential 22 remains entirely locked, even though there is a sudden increase in speed difference in the rear differential Nr due to slippage between the rear wheels.

When the brake and the anti-skid braking system (ABS) operate, the differentials 20, 21 and 22 are controlled as shown in TABLE II.

TABLE II

| Mode | Condition | Diff. | Control |
|---|---|---|---|
| A Mode | Brake ON | Front | Unlock (If = 0) |
|  |  | Center | Unlock (Ic = 0) |
|  |  | Rear | Unlock (Ir = 0) |
| C Mode | Brake ON | Front | Unlock (If = 0) |
|  |  | Center | Semi-Lock (Ic = 0.8A in 0.2 sec) |
|  |  | Rear | Unlock (Ir = 0) |
|  | ABS ON | Front | Unlock (If = 0) |
|  |  | Center | Unlock (Ic = 0 in 0.2 sec) |
|  |  | Rear | Unlock (Ir = 0) |
| R Mode | Brake ON | Front | Unlock (If = 0) |
|  |  | Center | Semi-lock (Ic = 0.8A in 0.2 sec) |
|  |  | Rear | Semi-lock (Ir = 1.2A in 0.2 sec) |
|  | ABS ON | Front | Unlock (If = 0) |
|  |  | Center | Unlock (Ic = 0) |
|  |  | Rear | Unlock (Ir = 0) |
| R2 Mode | Brake ON | Front | Unlock (If = 0) |
|  |  | Center | Unlock (Ic = 0) |
|  |  | Rear | Semi-lock (Ir = 1.2A in 0.2 sec.) |
|  | ABS ON | Front | Unlock (If = 0) |
|  |  | Center | Unlock (Ic = 0) |
|  |  | Rear | Unlock (Ir = in 0.2 sec) |
| F Mode | No ABS control is conducted | | |

As is apparent from TABLE II, the front differential 21, the center differential 20 and the rear differential 22 are controlled in different ways when the brake or the anti-skid braking system is functioning. The reason for this is that, in general, anti-skid braking control systems detect slipping or skidding of each wheel on the basis of vehicle speed and wheel speed in order to eliminate the tendency of each wheel to lock during braking. In other words, depending on whether or not any of the vehicle wheels are skidding while the control is conducted, the wheels are controlled to be appropriately unlocked, so as to restore control. However, if any of the front, center and rear differentials is entirely locked, it is difficult to estimate vehicle speed and perform anti-skid braking control appropriately.

In the A mode, when a brake signal BS exists, which indicates that the brakes are functioning and which is indicated as "Brake ON" in TABLE II, then the control currents If, Ic and Ir are set to the zero level (0) so as to unlock all of the front differential 21, the center differential 20 and the rear differential 22.

In the C mode, when a brake signal BS is detected, then, the control currents If, Ic and Ir are set to signal levels of 0 (zero), 0.8A and 0 (zero), respectively, so as to unlock the front differential 21 and the rear differential 22 and place the center differential 20 in the semi-locked state. Placing the center differential 20 in the semi-locked state is completed within 0.2 seconds after the appearance of the brake signal BS for restrictively controlling the differential action of the center differential 20. When an ABS signal ABS exists which indicates that the anti-skid braking system is functioning and which is indicated as "ABS ON" in TABLE II, then all of the control currents If, Ic and Ir are set to a signal level of 0 (zero) so as to unlock the front differential 21, the center differential 20 and the rear differential 22 entirely. Unlocking of the center differential 20 is completed within 0.2 seconds.

In the R mode, when a brake signal BS is detected, then the control currents If, Ic and Ir are set to signal levels of 0 (zero), 0.8A and 1.2A, respectively so as to unlock the front differential 21 and place the center differential 20 and the rear differential 22 in semi-locked states. When the ABS signal ABS is detected, then all of the control currents If, Ic and Ir are set to signal levels of 0 (zero) so as to entirely unlock the front differential 21, the center differential 20 and the rear differential 22.

In the R2 mode, when a brake signal BS is detected, then the control currents If, Ic and Ir are set to signal levels of zero (0), zero (0) and 1.2A, respectively, so as to unlock the front and center differentials 21 and 22 and place the rear differential 22 in the semi-locked state. Placing the rear differential 22 in the semi-locked state is completed within two seconds. When the ABS signal ABS is detected, then all of the control currents If, Ic and Ir are set to a signal level of 0 (zero) so as to entirely unlock the front differential 21, the center differential 20 and the rear differential 22. Unlocking of the rear differential 22 is completed within two seconds.

Anti-skid braking control is not used in the F mode.

Figure 10:
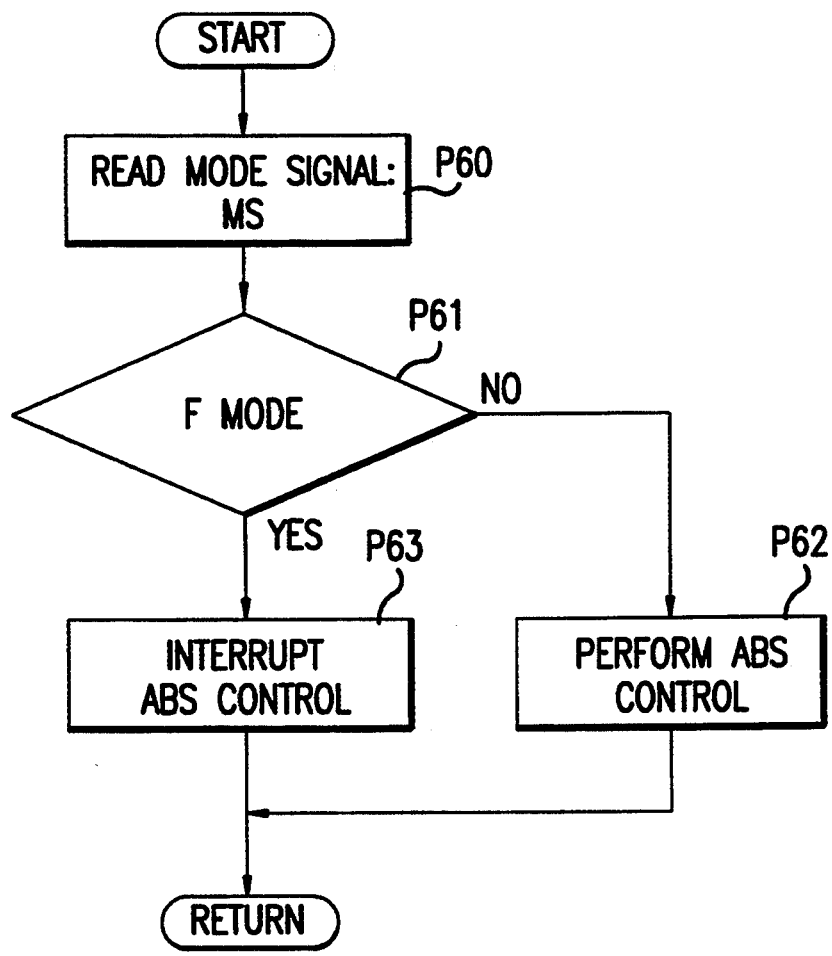
FIG. 10 is a flow chart illustrating an anti-skid braking interruption control in a mode referred to as an "F" mode for the microcomputer.

Referring to FIG. 10, which is a flow chart illustrating an anti-skid braking interruption control, the first step at step P60 in FIG. 10 is to read a mode signal MS from the mode switch 44. A decision is made at step P61 as to whether or not the F mode has been selected. When the F mode is not selected, the anti-skid braking control is made available at step P62. On the other hand, when the F mode is selected, the anti-skid braking control is interrupted at step P63.

As is apparent from the above description and as shown in TABLE II, when the brake is applied in the A mode, the C mode or the R mode, any differential that is previously in the unlocked state or in the semi-locked state is unlocked, and any differential that is previously in the locked state is placed in the semi-locked state. Thereafter, when the ABS control is applied, the front differential 21, the center differential 20, and the rear differential 22 are entirely unlocked all at once. Therefore, when the ABS control is applied, all the differentials are unlocked, since each differential has a reduced restrictive force upon brake application, the responsiveness of the vehicle to ABS control is improved. In addition, in the F mode, priority is given to differential control over ABS control. Consequently, a desired driving power is obtained.

If an electric energy-saving control, which is conducted during high speed driving, is needed, then the differentials 20, 21 and 22 are controlled as shown in TABLE III.

TABLE III

| Mode | Diff. | Vsp [Km/h] 30 | 50 | 100 | 200 |
|---|---|---|---|---|---|
| C Mode | Center | Entire Lock (Ic = 2.2A) | | Auto Mode Control | |
| R Mode | Center | Entire Lock (Ic = 2.2A) | | Auto Mode Control | |
|  | Rear | Entire Lock (Ir = 4.1A) | | Auto Mode Control | |
| R2 Mode | Rear | Entire Lock (Ir = 4.1A) | | Auto Mode Control | |
| F Mode | Front | Entire Lock (If = 4.1A) | | Unlock (If = 0) | |
|  | Center | Entire Lock (Ic = 2.2A) | | Auto Mode Control | |
|  | Rear | Entire Lock (Ir = 4.1A) | | Auto Mode Control | |

In the electric energy-saving control for high speed driving, the center differential 20 is forcibly locked and maintained in the locked state in any of the C, R and F modes when the vehicle speed Vsp is less than 100 km/h. At vehicle speeds in excess of 100 km/h, the center differential 20 is put into the auto-control mode. Similarly, the rear differential 22 is forcibly locked and maintained in the locked state in any of the R, R2 and F modes for vehicle speeds less than 50 km/h. At vehicle speeds in excess of 50 km/h, the rear differential 22 is put into the auto-control mode. The front differential 21 is forcibly locked and maintained in the locked state In the F mode for vehicle speeds less than 30 km/h and is unlocked and maintained the unlocked state for vehicle speeds in excess of 30 km/h.

In the electric energy-saving control during high speed driving, in the C mode, the R mode and the F mode at vehicle speeds Vsp in excess of 100 km/h, there is little chance of sustaining wheel slippage, even under acceleration. Off-road driving is unlikely to occur at these speeds. For this reason, there is no problem in switching the center differential 20 from the locked state to the auto-control mode. Since, in the auto-control mode, the center differential 20 is selectively placed in the unlocked state, the semi-locked state and the entirely locked state according to driving conditions, the solenoid clutch 50 of the center differential 20 does not operate other than when necessary. This saves electric energy and contributes to or enhances fuel efficiency in the high vehicle speed range. Moreover, in states other than the entirely locked state, the center differential 20 functions during cornering without wheel slippage, so that running resistance is lowered and fuel efficiency is improved in addition, the center differential 20 is forcibly placed in the auto-control mode at high speeds, i.e., speeds in excess of 100 km/h. A high driving stability is realized.

In the R mode and the F mode, the rear differential 22 is switched over to the auto-control mode at speeds Vsp in excess of 50 km/h. This saves electric energy and lowers running resistance, which contributes to or enhances the fuel economy and driving stability.

In the F mode, at speeds in excess of 30 km/h, the front differential 21 is unlocked in an attempt to improve operability. In this mode, there is also a measurable improvement in fuel economy due to savings in electric energy.

In the electric energy-saving control during high speed driving, critical vehicle speeds, at which respective differentials are switched to the auto-control mode or to the unlock state from the entirely locked state, differ from one another. When the vehicle is traveling, there must be an effective and sure transfer of driving force from the engine to the respective wheels. As a result, the center differential, which is the closest of the three differentials to the engine, is kept in the locked state up to the critical speed of 100 km/h, which is a relatively high speed. In addition, the front differential 21 and the rear differential 22, which affect the front and rear wheels 16 and 18 only, are released from their entirely locked states at the critical speeds of 50 km/h and 30 km/h, respectively, which are relatively low speeds, so as to save electric energy and improve fuel economy. Car handling can also be improved by keeping the front differential 21, which greatly influences car handling, unlocked at lower vehicle speeds. It is unlikely that the vehicle would be subjected to off-road driving at vehicle speeds in excess of 30 km/h, which require the front differential 21 to be kept entirely locked.

Figure 11A:
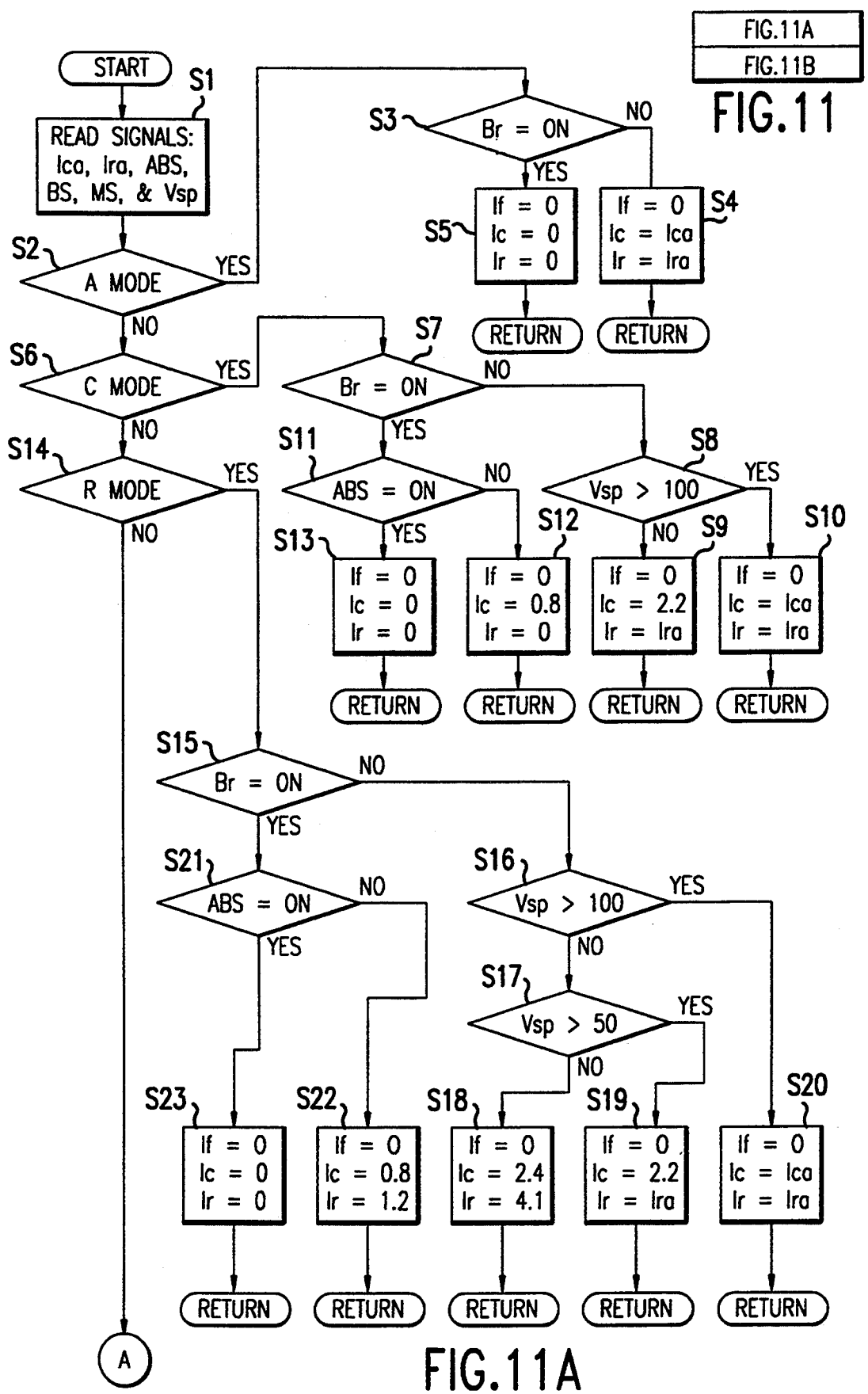
FIG. 11 is a flow chart illustrating a vehicle control routine for the microcomputer.
Figure 11B:
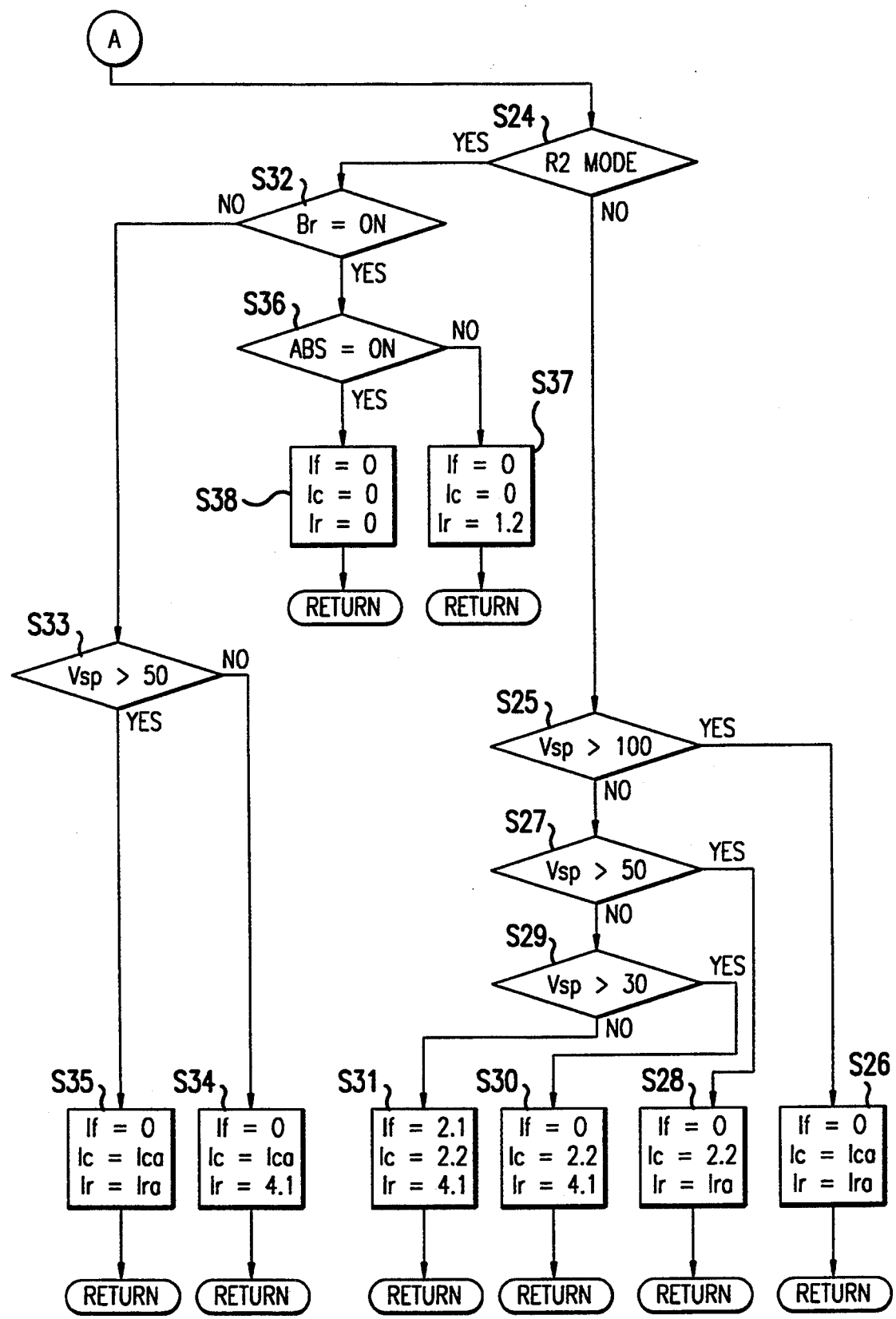

FIG. 11 is a flow chart of the vehicle control routine by which the vehicle control system in accordance with a preferred embodiment of the present invention controls a four-wheel drive vehicle. The first step S1 in FIG. 11 is to read various signals in the auto-control mode, such as a control current Ica of the center differential 20, a control current Ira of the rear differential 22, an anti-skid braking signal ABS, a braking signal BS, a control mode signal MS and a vehicle speed Vsp. At step S2, a decision is made as to whether or not the auto-control mode is has been selected by the mode switch 44. If the answer is "YES," a decision is made at step S3, based on the braking signal BS, as to whether or not the brake is applied. If the answer to the decision made at step S3 is "NO," this indicates that the brake is not applied. Then, the control currents If, Ic and Ir are set or changed to zero (0), Ica and Ira to unlock the front differential 21 and place the center differential 20 and the rear differential 22 in their auto-control modes at step S4. Thereafter, a return is ordered. On the other hand, if the answer to the decision made at step S3 is "YES," this indicates that the brake is applied. Then, all the control currents If, Ic and Ir are set or changed to zero (0) to unlock the front differential 21, the center differential 20 and the rear differential 22 all at once at step S5. Thereafter, a return is ordered.

If the answer to the decision made at step S2 is "NO" then a decision is made at step S6 as to whether or not the C mode has been selected by the mode switch 44. If the vehicle is in the C mode, then a decision is made at step S7 as to whether or not the brake is applied. If the answer is "NO," this indicates that the brake is not applied. Then, a decision regarding the critical vehicle speed for the center differential 20 is made at step S8. That is, a decision is made at step S8 as to whether or not the vehicle speed Vsp exceeds the critical speed of 100 km/h. If the answer to the decision made at step S8 is "NO," this indicates that the vehicle is traveling at a relatively low speed. Then, the control currents If, Ic and Ir are set or changed to zero (0), 2.2A and Ira, respectively, to unlock the front differential 21, entirely lock the center differential 20 and place the rear differential 22 in its auto-control mode at step S9. However, if the answer to the decision made at step S8 is "YES," this indicates that the vehicle is traveling at a high speed higher than the critical speed of 100 km/h. Then, the control currents If, Ic and Ir are set or changed to zero (0), Ica and Ira, respectively, to unlock the front differential 21 and place the center differential 20 and the rear differential 22 in their auto-control modes at step S10. On the other hand, if the answer to the decision regarding braking made at step S7 is "YES," a decision is made at step S11, on the basis of the anti-skid braking signal ABS, as to whether or not the anti-skid braking system is activated. When the antiskid braking system is not activated and the answer to the decision made at step S11 is "NO" then the control currents If, Ic and Ir are set or changed to zero (0), 0.8A and zero (0), respectively, to unlock the front differential 21 and the rear differential 22 and place the center differential 20 in the semi-locked state at step S12. Otherwise, the answer to the decision is "YES," and all the control currents If, Ic and Ir are set or changed to zero (0) to unlock the front differential 21, the center differential 20 and the rear differential 22 all at once at step S13. These steps S12 and S13 also order return.

If the answer to the decision regarding the C mode made at step S6 is "NO," then a decision regarding the R mode is made. That is, at step S14, a decision is made as to whether or not the R mode has been selected by the mode switch 44. If the R mode has been selected, then a decision is made at step S15 as to whether or not the brake is applied. In the event that no brake is applied, then a decision is made at step S16 as to whether or not the vehicle speed Vsp exceeds the critical speed of 100 km/h for the center differential 20. If the answer to the decision made at step S16 is "NO," this indicates that the vehicle is traveling at a relatively low speed. Then, another decision is made at step S17 as to whether or not the vehicle speed Vsp exceeds the critical speed of 50 km/h for the rear differential 22. If the answer to the other decision made at step S17 is "NO" then the control currents If, Ic and Ir are set or changed to zero (0), 2.2A and 4.1A, respectively, to unlock the front differential 21 and entirely lock the center and rear differentials 20 and 22 at step S18. However, if the answer to the decision is "YES," this indicates that the vehicle is traveling at a speed between the critical speeds of 50 and 100 km/h. Then, the control currents If, Ic and Ir are set or changed to zero (0), 2.2A and Ira, respectively, to unlock the front differential 21, entirely lock the center differential 20 and place the rear differential 22 in its auto-control mode at step S19. If the answer to the decision made at step S16 regarding the critical vehicle speed of 100 Km/h for the center differential 20 is "YES," the control currents If, Ic and Ir are set or changed to zero (0), Ica and Ira to unlock the front differential 21 and place the center and rear differential 20 and 22 in their auto-control modes at step S20. After setting the control currents If, Ic and It, a return is ordered.

In the event that the answer to the decision regarding braking made at step S15 is "YES," another decision is made on the basis of the anti-skid braking signal ABS at step S21 as to whether or not the anti-skid braking system is activated. When the anti-skid braking system is not activated and the answer to the decision made at step S21 is "NO," then the control currents If, Ic and Ir are set or changed to zero (0), 0.8A and 1.2A, respectively, to unlock the front differential 21 and place the center and rear differentials 20 and 22 in the semi-locked state at step S22. Otherwise, if the answer to the decision is "YES," then all the control currents If, Ic and Ir are set or changed to zero (0) to unlock the front differential 21, the center differential 20 and the rear differential 22 all at once at step S23. After setting control currents If, Ic and Ir, a return is ordered.

In the event that the answer to the decision regarding the C mode made at step S14 is "NO," a decision is made regarding the R2 mode at step S24. If the mode switch 44 has not selected the R2 mode, decisions regarding the critical speeds of 100 km/h, 50 km/h and 30 km/h for the center differential 20, the rear differential 22 and the front differential 22 are made at steps S25, S27 and S29, respectively, in order. If the vehicle speed Vsp exceeds the critical speed of 100 km/h for the center differential 20, the control currents If, Ic and Ir are set or changed to zero (0), Ica and Ira to unlock the front differential 21 and place the center differential 20 and the rear differential 22 in their auto-control modes at step S26. On the other hand, if the vehicle speed Vsp is between the critical speeds of 100 km/h and 50 km/h, that is, the answer to the decision made at step 25 is "NO" but the answer to the decision made at step S27 is "YES", then the control currents If, Ic and Ir are set or changed to zero (0), 2.2A and Ira, respectively, to unlock the front differential 21, entirely lock the center differential 20 and place the rear differential 22 in its auto-control mode at step S28. Otherwise, if the vehicle speed Vsp is between the critical speeds of 50 km/h and 30 km/h, the answer to the decision made at step 27 is "NO" but the answer to the decision made at step S29 is "YES". Then, the control currents If, Ic and Ir are set or changed to zero (0), 2.2A and 4.1A, respectively, to unlock the front differential 21 and entirely lock the center and rear differentials 20 and 22 at step S30. However, if the vehicle speed Vsp is less than the critical speed of 30 km/h for the front differential 21, then the control currents If, Ic and Ir are set or changed to 2.1A, 2.2A and 4.1A, respectively, to entirely lock the center differential 20, the front differential 21 and the rear differential 22 at step S31. After setting the control currents If, Ic and Ir, a return is ordered.

When in fact the mode switch 44 has already been used to select the R2 mode and the answer to the decision made at step S24 is "YES," then a decision is made at step S32 as to whether or not the brake is applied. If the answer to the decision made at step S32 is "NO," then a decision regarding the critical vehicle speed of 50 km/h for the rear differential 20 is made at step S33. That is, a decision is made as to whether or not the vehicle speed Vsp is in excess of the critical speed of 50 km/h. If the answer to the decision made at step S33 is "NO," then the control currents If, Ic and Ir are set or changed to zero (0), Ica and 4.1A, respectively, to unlock the front differential 21, place the center differential 20 in the auto-control mode and entirely lock the rear differential 22 at step S34. However, if the answer to the decision made at step S33 is "YES," then the control currents If, Ic and Ir are set or changed to zero (0), Ica and Ira, respectively, to unlock the front differential 21 and place the center and rear differentials 20 and 22 in their auto-control mode at step S35. On the other hand, if the answer to the decision regarding braking made at step S32 is "YES," a decision is made on the basis of the anti-skid braking signal ABS at step S36 as to whether or not the anti-skid braking system is activated. When the anti-skid braking system is not activated, the answer to the decision made at step S36 is "NO." Then, the control currents If, Ic and Ir are set or changed to zero (0), zero (0) and 1.2A, respectively, to unlock the front differential 21 and the center differential 20 and place the rear differential 22 in the semi-locked state at step S37. Otherwise, if the answer to the decision is "YES," then all the control currents If, Ic and Ir are set or changed to zero (0) to unlock all of the front differential 21, the center differential 20 and the rear differential 22 at once at step S38. After setting control currents If, Ic and Ir, a return is ordered.

It is to be understood that although a specific embodiment of the present invention has been described, various other embodiments and variants may occur to those skilled in the art. Any such embodiments and variants which fall within the scope and spirit of the invention are intended to be covered by the following claims.

What is claimed is:

1. A vehicle control system for controlling a four-wheel drive vehicle, comprising:
   first differential means, disposed between front and rear propeller shafts, for driving front and rear wheels at the same time but allowing said front and rear wheels to turn at different wheel speeds, said first differential means being able to be locked and unlocked;

second differential means, disposed between left and right axles, for driving left and right wheels at the same time but allowing said left and right wheels to turn at different wheel speeds, said second differential means being able to be locked and unlocked;

driving condition detecting means for detecting driving conditions of said vehicle;

differential mode control means for operating in a first mode to variably restrict differential action of each of said first differential means and said second differential means between an unlocked state and a locked state according to driving conditions detected by said driving condition detecting means and in a second mode for forcibly locking said first differential means and variably restricting differential action of said second differential means between said unlocked state and said locked state according to said driving conditions; and manually operated mode selection means for selectively causing said differential mode control means to operate between said first mode and said second mode.

2. A vehicle control system as defined in claim 1, wherein said driving condition detecting means comprises a speed sensor for detecting a wheel speed of each of said wheels so as to determine a first difference between wheel speeds of said front and rear wheels and a second difference between wheel speeds of said left and right wheels.

3. A vehicle control system as defined in claim 2, wherein said differential mode control means forcibly locks said first differential means in said first mode when said driving condition detecting means determines a predetermined first difference to be present between said wheel speeds of said front and rear wheels and locks said second differential means in the first and second modes when said driving condition detecting means determines a predetermined second difference to be present between said wheel speeds of said left and right wheels.

4. A vehicle control system as defined in claim 2, wherein said differential mode control means comprises a multi-plate solenoid clutch, incorporated in each of said first and second differential means, which variably produces slippage according to levels of a control current applied thereto, thereby controlling said differential action.

5. A vehicle control system as defined in claim 4, wherein said driving condition detecting means provides a first electric signal having a current level representative of said first difference between said wheel speeds of said front and rear wheels and a second electric signal having a current level representative of said second difference between said wheel speeds of said left and right wheels to said differential mode control means.

6. A vehicle control system as defined in claim 1, wherein said second differential means comprises a rear differential disposed between left and right rear axles.

7. A vehicle control system for controlling a four-wheel drive vehicle, comprising:

first differential means, disposed between front and rear propeller shafts, for driving front and rear wheels at the same time but allowing said front and rear wheels to turn at different wheel speeds, said first differential means being able to be locked and unlocked;

second differential means, disposed between left and right axles for driving left and right wheels at the same time but allowing said left and right wheels to turn at different wheel speeds, said second differential means being able to be locked and unlocked;

driving condition detecting means for detecting driving conditions of said vehicle;

differential mode control means for operating in a first mode to variably restrict differential action of each of said first differential means and said second differential means between an unlocked state and a locked state according to driving conditions detected by said driving condition detecting means, in a second mode for forcibly locking said first differential means and variably restricting differential action of said second differential means between said unlocked state and said locked state according to said driving conditions, and in a third mode for forcibly locking both said first differential means and said second differential means; and manually operated mode selection means for selectively causing said differential mode control means to operate among said first mode, said second mode and said third mode.

8. A vehicle control system as defined in claim 7, wherein said driving condition detecting means comprises a speed sensor for detecting a wheel speed of each of said wheels so as to determine a first difference between wheel speeds of said front and rear wheels and a second difference between wheel speeds of said left and right wheels.

9. A vehicle control system as defined in claim 8, wherein said differential mode control means forcibly locks said first differential means in said first mode when said driving condition detecting means determines a predetermined first difference to be present between said wheel speeds of said front and rear wheels and locks said second differential means in both the first and second modes when said driving condition detecting means determines a predetermined second difference to be present between said wheel speeds of said left and right wheels.

10. A vehicle control system as defined in claim 8, wherein said differential mode control means comprises a multi-plate solenoid clutch, incorporated in each of said first differential means and said second differential means, which variably produces slippage according to levels of a control current applied thereto, thereby controlling said differential action.

11. A vehicle control system as defined in claim 10, wherein said driving condition detecting means provides a first electric signal having a current level representative of said first difference between said wheel speeds of said front and rear wheels and a second electric signal having a current level representative of said second difference between said wheel speeds of said left and right wheels to said differential mode control means.

12. A vehicle control system as defined in claim 7, wherein said second differential means comprises a rear differential disposed between left and right rear axles.

13. A vehicle control system for controlling a four-wheel drive vehicle, comprising:

first differential means, disposed between front and rear propeller shafts, for driving front and rear wheels at the same time but allowing said front and rear wheels to turn at different wheel speeds, said first differential means being able to be locked and unlocked;

second differential means, disposed between left and right axles, for driving left and right wheels at the same time but allowing said left and right wheels to turn at different wheel speeds, said second differential means being able to be locked and unlocked;

driving condition detecting means for detecting driving conditions of said vehicle;

differential mode control means for operating in a first mode to variably restrict differential action of each of said first differential means and said second differential means between an unlocked state and a locked state according to driving conditions detected by said driving condition detecting means, in a second mode for forcibly locking said first differential means and variable restricting differential action of said second differential means between said unlocked state and said locked state according to said driving conditions, in a third mode for forcibly locking both said first differential means and said second differential means, and in a fourth mode for variably restricting differential action of said first differential means and forcibly locking said second differential means; and manually operated mode selection means for selectively causing said differential mode control means to operate among said first mode, said second mode, said third mode and said fourth mode.

14. A vehicle control system as defined in claim 13, wherein said driving condition detecting means comprises a speed sensor for detecting a wheel speed of each of said wheels so as to determine a first difference between wheel speeds of said front and rear wheels and a second difference between wheel speeds of said left and right wheels.

15. A vehicle control system as defined in claim 14, wherein said differential mode control means forcibly locks said first differential means in said first mode when said driving condition detecting means determines a predetermined first difference to be present between said wheel speeds of said front and rear wheels and locks said second differential means in both the first and second modes when said driving condition detecting means determines a predetermined second difference to be present between said wheel speeds of said left and right wheels.

16. A vehicle control system as defined in claim 14, wherein said differential mode control means comprises a multi-plate solenoid clutch, incorporated in each of said first differential means and said second differential means, which variably produces slippage according to levels of a control current applied thereto, thereby controlling said differential action.

17. A vehicle control system as defined in claim 16, wherein said driving condition detecting means provides a first electric signal having a current level representative of said first difference between said wheel speeds of said front and rear wheels and a second electric signal having a current level representative of said second difference between said wheel speeds of said left and right wheels to said differential mode control means.

18. A vehicle control system as defined in claim 13, wherein said second differential means comprises a rear differential disposed between left and right rear axles.

19. A vehicle control system for controlling a four-wheel drive vehicle, comprising:

center differential means, disposed between front and rear propeller shafts, for driving front and rear wheels at the same time but allowing said front and rear wheels to turn at different wheel speeds, said center differential means being able to be locked and unlocked;

rear differential means, disposed between left and right rear axles, for driving left and right rear wheels at the same time but allowing said left and right rear wheels to turn at different wheel speeds, said rear differential means being able to be locked and unlocked;

front differential means, disposed between left and right front axles, for driving left and right front wheels at the same time but allowing said left and right front wheels to turn at different wheel speeds, said front differential means being able to be locked and unlocked;

driving condition detecting means for detecting driving conditions of said vehicle;

differential mode control means for operating in a first mode to variably restrict differential action of each of said center differential means and said rear differential means between an unlocked state and a locked state according to driving conditions detected by said driving condition detecting means and maintaining said front differential means in an unlocked state, in a second mode for forcibly locking said center differential means, variably restricting differential action of said rear differential means between said unlocked state and said locked state according to said driving conditions and keeping said front differential means in said unlocked state, in a third mode for forcibly locking both said center differential means and said rear differential means and keeping said front differential means in said unlocked state, in a fourth mode for variably restricting differential action of said center differential means, forcibly locking said rear differential means and keeping said front differential means in said unlocked state, and in a fifth mode for forcibly locking all of said center differential means, said rear differential means and said front differential means; and manually operated mode selection means for selectively causing said differential mode control means to operate among said first mode, said second mode, said third mode, said fourth mode and said fifth mode.

20. A vehicle control system as defined in claim 19, wherein said driving condition detecting means comprises a speed sensor for detecting a wheel speed of each of said wheels so as to determine a center difference between wheel speeds of said front and rear wheels, a rear difference between wheel speeds of said left and right rear wheels, and a front difference between wheel speeds of said left and right front wheels.

21. A vehicle control system as defined in claim 20, wherein said differential mode control means forcibly locks said center differential means in said first mode and in said fourth mode when said driving condition detecting means determines a predetermined center difference to be present between said wheel speeds of said front and rear wheels and locks said rear differential means in said first mode and in said second mode when said driving condition detecting means determines a predetermined rear difference to be present between said wheel speeds of said left and right rear wheels.

22. A vehicle control system as defined in claim 20, wherein said differential mode control means comprises a multi-plate solenoid clutch, incorporated in each of the center, rear and front differential means, which variably produces slippage according to levels of a control current applied thereto, thereby controlling said differential action.

23. A control system as defined in claim 22, wherein said driving condition detecting means provides a first electric signal having a current level representative of said center difference between said wheel speeds of said front and rear wheels and a second electric signal having a current level representative of said rear difference between said wheel speeds of said left and right rear wheels to said differential mode control means.

* * * * *